United States Patent
Ryan

(10) Patent No.: US 7,094,388 B2
(45) Date of Patent: Aug. 22, 2006

(54) VOLATILE ORGANIC COMPOUND ABATEMENT THROUGH A FUEL CELL

(75) Inventor: Patrick A. Ryan, Sterling Heights, MI (US)

(73) Assignee: DTE Energy Technologies, Inc., Detroit, MI (US)

( * ) Notice: Subject to any disclaimer, the term of this patent is extended or adjusted under 35 U.S.C. 154(b) by 90 days.

(21) Appl. No.: 10/369,418

(22) Filed: Feb. 18, 2003

(65) Prior Publication Data

US 2003/0202914 A1 Oct. 30, 2003

Related U.S. Application Data

(62) Division of application No. 09/556,072, filed on Apr. 21, 2000, now abandoned.

(51) Int. Cl.
C01B 3/24 (2006.01)
C01B 3/38 (2006.01)
B01D 53/02 (2006.01)

(52) U.S. Cl. .................... 423/650; 423/245.1; 252/373

(58) Field of Classification Search ............... 252/373; 95/141, 143, 147; 423/245.1, 650
See application file for complete search history.

(56) References Cited

U.S. PATENT DOCUMENTS

| | | | |
|---|---|---|---|
| 3,897,193 A | 7/1975 | Kattan et al. | |
| 4,203,963 A | 5/1980 | Scheffler et al. | |
| 4,846,852 A | 7/1989 | Schweitzer et al. | |
| 5,035,117 A | 7/1991 | Drake | |
| 5,064,447 A | 11/1991 | Lee | |
| 5,152,812 A | 10/1992 | Kovach | |
| 5,198,001 A | 3/1993 | Knebel et al. | |
| 5,248,566 A * | 9/1993 | Kumar et al. ................. | 429/19 |
| 5,269,833 A | 12/1993 | Nitsche | |
| 5,271,762 A | 12/1993 | Schoofs et al. | |
| 5,294,246 A | 3/1994 | Gardner, Sr. | |
| 5,308,457 A | 5/1994 | Dalla Betta et al. | |
| 5,312,477 A | 5/1994 | Minor | |
| 5,389,125 A | 2/1995 | Thayer et al. | |
| 5,415,682 A | 5/1995 | Zarchy et al. | |
| 5,439,594 A | 8/1995 | Regan et al. | |
| 5,451,249 A | 9/1995 | Spiegel et al. | |
| 5,453,259 A | 9/1995 | D'Souza | |

(Continued)

FOREIGN PATENT DOCUMENTS

EP 1231662 8/2002

(Continued)

OTHER PUBLICATIONS

"Concentrator System: The Preferred Solution for Dilute VOC/HAP Applications", Michael J. Caruso, Jr., M & W Industries, Inc., Rural Hall, NC, date unknown.

(Continued)

Primary Examiner—Colleen P. Cooke
(74) Attorney, Agent, or Firm—Reising, Ethington, Barnes, Kisselle, P.C.

(57) ABSTRACT

The exhaust of a vehicle paint spray booth is fed through an adsorption medium, such as activated carbon, to remove volatile organic compounds by adsorption. When the adsorbent becomes saturated, it is purged by electric heaters, and the desorbed volatile organic compounds are directed to the fuel processor of a stationary fuel cell. The volatile organic compounds are broken down into oxides of carbon and hydrogen gas in the fuel processor, the hydrogen is fed to the fuel cell, and the oxides of carbon are vented to the atmosphere with excess air. The fuel cell combines the hydrogen with oxygen from air, and releases air, water vapor and electrical power.

2 Claims, 2 Drawing Sheets

U.S. PATENT DOCUMENTS

| | | |
|---|---|---|
| 5,503,658 A | 4/1996 | Zarchy et al. |
| 5,512,082 A | 4/1996 | Zarchy et al. |
| 5,516,499 A | 5/1996 | Pereira et al. |
| 5,538,540 A | 7/1996 | Whitlock |
| 5,542,965 A | 8/1996 | Straubinger et al. |
| 5,637,283 A | 6/1997 | Stilger et al. |
| 5,692,458 A | 12/1997 | Green |
| 5,695,546 A | 12/1997 | Izumi et al. |
| 5,702,505 A | 12/1997 | Izumi et al. |
| 5,727,903 A | 3/1998 | Borray et al. |
| 5,759,496 A | 6/1998 | Hickman et al. |
| 5,770,784 A | 6/1998 | Heywood et al. |
| 5,830,423 A | 11/1998 | Trocciola et al. |
| 5,858,316 A | 1/1999 | Berndt et al. |
| 5,908,490 A | 6/1999 | Akamatsu et al. |
| 5,925,323 A | 7/1999 | Gupta |
| 6,071,326 A | 6/2000 | Hall |
| 6,083,425 A | 7/2000 | Clawson et al. |
| 6,123,913 A | 9/2000 | Clawson et al. |
| 6,205,704 B1 | 3/2001 | Schmitz et al. |
| 6,207,122 B1 | 3/2001 | Clawson et al. |
| 6,251,347 B1 | 6/2001 | Campbell et al. |
| 6,254,839 B1 | 7/2001 | Clawson et al. |
| 2002/0100277 A1 | 8/2002 | Youn |
| 2003/0088139 A1 | 5/2003 | Nagji |

FOREIGN PATENT DOCUMENTS

| | | |
|---|---|---|
| GB | 2364257 | 1/2002 |
| WO | 9530470 | 11/1995 |

OTHER PUBLICATIONS

"Environmental Science & Technology", The American Chemical Society, ES&T Mar. 1997 Technology Update.

Dürr Concentrator Technology—Standard Products Custom Systems, Dürr Environmental (Jun. 12, 2003).

Problems of the Environment—Incineration of Volatile Organic Compounds, North American Energy Systems Corp., Feb. 2002.

Cogeneration: Electrical Power, Process Heat, VOC Emmissions, APSCO, 2001.

Power Perspectives, Ingersoll-Rand Energy Systems, PowerWorks News, Views and Applications, vol. 1, Issue 2, date unknown.

VOC Destruction Using Combustion Turbines, William E. Partanen, P.E. of Neill and Gunter, Sep. 2002.

Opinion and Order, Case No. U-13129 (Jul. 3, 2002).

* cited by examiner

VOLATILE ORGANIC COMPOUND ABATEMENT THROUGH A FUEL CELL

This application is a division of application Ser. No. 09/556,072 filed Apr. 21, 2000 now abandoned. The present invention is directed to a system and method for abating volatile organic compounds from a source of such compounds, such as a vehicle paint spray booth, and more particularly a system and method for releasing hydrogen from such compounds and directing the hydrogen to a fuel cell for generating electrical power.

BACKGROUND AND SUMMARY OF THE INVENTION

A vehicle paint spray booth exhausts air laden with volatile organic compounds. These compounds must be removed from the exhaust air stream to comply with applicable environment regulations. Existing abatement systems typically burn the exhaust to break down the volatile organic compounds into, among other products, oxides of nitrogen, which must then themselves be abated. In addition, there is a substantial cost associated with energy consumption. It is an object of the present invention to provide a system and method for abating or removing volatile organic compounds from an air stream, such as the exhaust from a vehicle paint spray booth, that require reduced energy consumption, and that produce hydrogen as a product that can be fed to a fuel cell to produce electrical power. Another object of the invention is to provide an electrical power system and method that include a stationary fuel cell which delivers power derived from volatile organic compounds removed from an air stream.

A system for removing volatile organic compounds from an air stream in accordance with a presently preferred embodiment of the invention includes an adsorption system operable in a first mode of operation for adsorbing volatile organic compounds from the air stream, and in a second mode of operation for heating the adsorbent to release the volatile organic compounds adsorbed during the first mode of operation. A fuel processor receives the volatile organic compounds released during the second mode of operation to convert the volatile organic compounds into hydrogen and oxides of carbon. In the preferred embodiment of the invention, the hydrogen is fed to a fuel cell for producing electrical power. The adsorption system in accordance with the preferred embodiment of the invention includes a plurality of adsorbents and associated heaters disposed in associated chambers, and valves for routing the incoming air stream through at least one of the chambers while at the same time operating the heaters associated with at least one of the other chambers to release the volatile organic compounds previously adsorbed. In this way, the system is continuously operable to produce hydrogen fed to the fuel cell.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
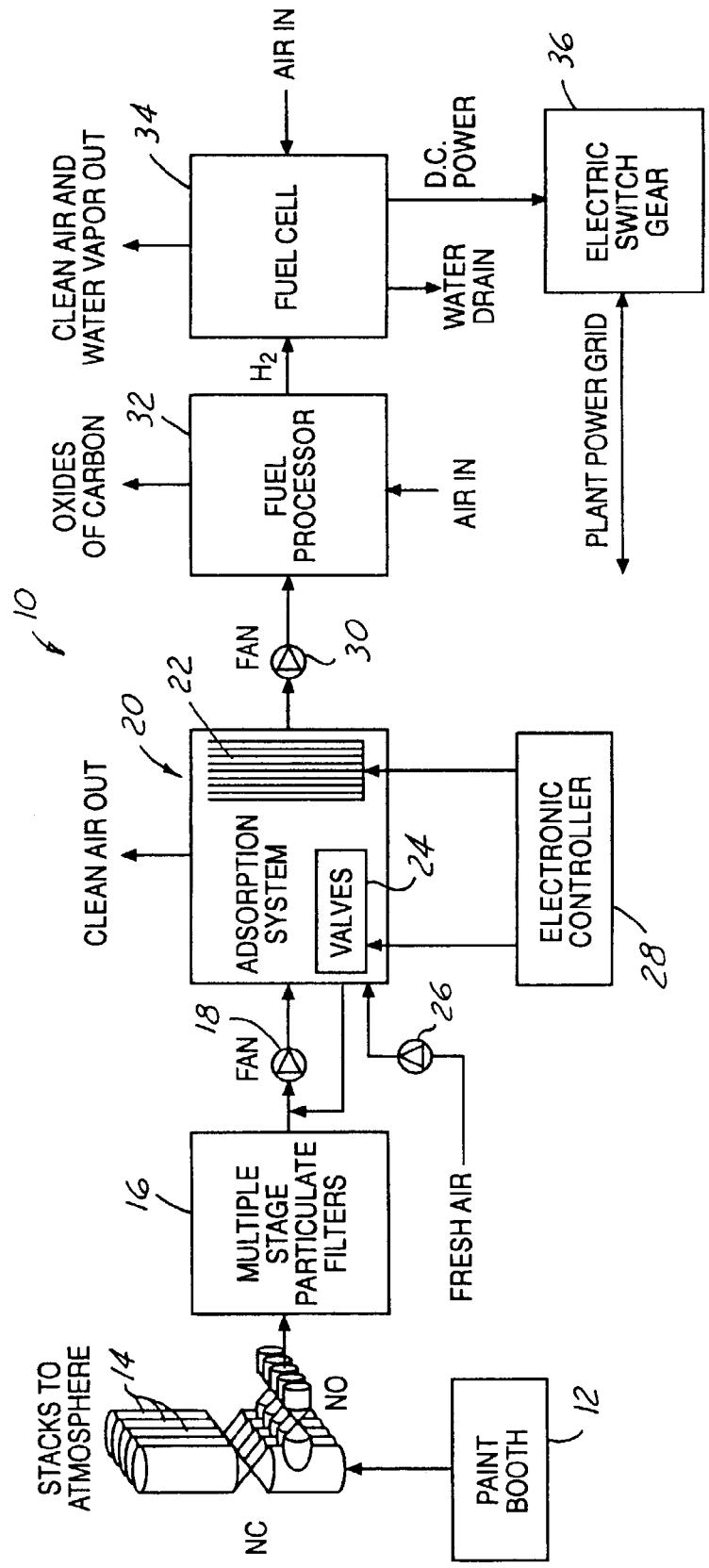
FIG. 1 is a functional block diagram of a system for removing volatile organic compounds from an air stream in accordance with a presently preferred embodiment of the invention.

FIG. 1 illustrates a system 10 in accordance with a presently preferred embodiment of the invention. Exhaust air leaving a vehicle paint spray booth 12 is directed to a plurality of atmospheric stacks 14. The exhaust from paint spray booth 12 is laden with volatile organic compounds in concentrations ranging from one to one thousand parts per million. Normally open control dampers direct the exhaust air stream to and through a set of multiple stage particulate filters 16. Normally closed bypass dampers in stacks 14 provide for temporary exhaustion to atmosphere in the event of system failure. A booster fan 18 directs the air stream from filters 16 to an adsorption system 20. Filters 16, which may be of any suitable type, remove solid material from the air stream to protect the adsorption medium. Adsorption system 20 includes an adsorption medium carried on or associated with an electrical heater 22, and a plurality of valves 24 for controlling flow of gas through adsorption system 20. Fresh air is provided by a fan 26. Valves 24 and heater 22 are controlled by an electronic controller 28. Heaters 22 preferably comprise electrical resistance heaters operated by controller 28 to heat the adsorbent medium to a temperature on the order of 250° F. At this temperature, the adsorbed volatile organic compounds flash from the adsorbent material and enter the gaseous phase. Any non-volatile hydrocarbons that pass through filters 16 and reach the adsorbent material will cross-link and remain permanently affixed to the adsorbent medium. The adsorbent material may be of any suitable porous type, such as activated carbon, zeolite or synthetic adsorbent resin.

The volatile organic compounds released or desorbed from the adsorbent are fed by a fan 30 to a fuel processor 32. Fuel processor 32 also receives air as an input, and converts the volatile organic compounds input by fan 30 into hydrogen and oxides of carbon. Partial oxidation, auto thermal reforming or steam reforming can be used to separate the hydrogen from the carbon in a non-combustion process. Since the air stream is filtered and isolated from the fuel processor by adsorption system 20, few contaminants will migrate to the fuel processor stage. Suitable controls may be employed to maintain a stoichiometric air/fuel mixture within processor 32. This can be accomplished with a timing circuit or an oxygen analyzer. The hydrogen generated in fuel processor 32 is fed to a stationary fuel cell 34, which also receives air as an input. The fuel cell uses the oxygen from the input air and the hydrogen from fuel processor 32 to generate electrical power fed to switch gear 36. Water vapor and excess air are exhausted to the atmosphere, as are the oxides of carbon generated in fuel processor 32. Water is drained from fuel cell 34. Electrical switch gear 36 converts DC input power from fuel cell 34 to AC power for use elsewhere in the electrical power grid of the plant.

Figure 2:
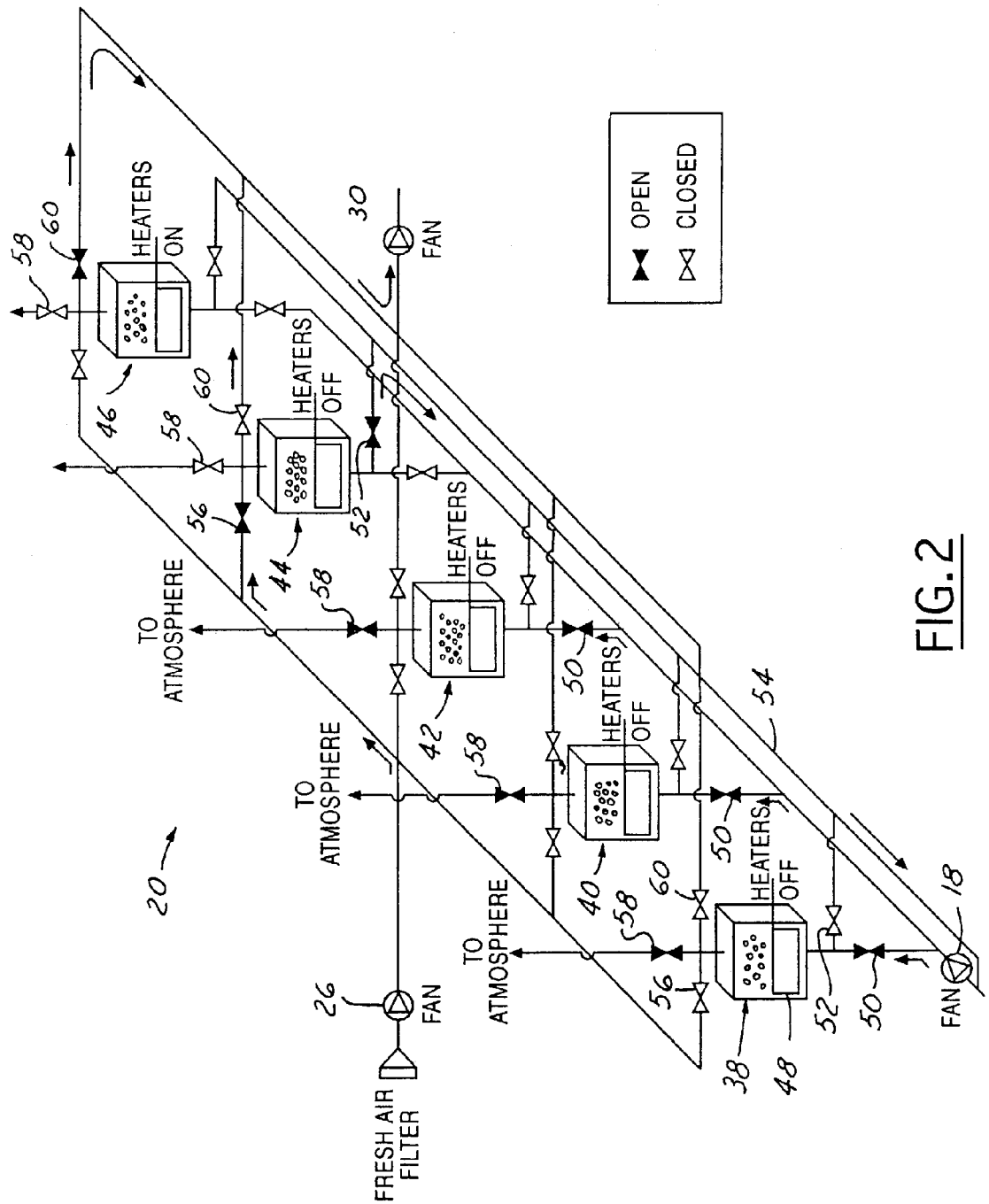
FIG. 2 is a schematic diagram of the adsorption system illustrated in block form in FIG. 1.

FIG. 2 is a schematic diagram illustrative of adsorption system 20. A plurality of reaction chambers 38, 40, 42, 44, 46 each contain an adsorbent material or material blend 48 disposed on or associated with an electrical heater 22. Heaters 22 are individually controlled by electronic controller 28 (FIG. 1). Each chamber 38–46 has an associated inlet valve 50 for selectively admitting the inlet air stream from fan 18, a bypass valve 52 for bypassing inlet gas to a return path 54 connected to fan 18, and three valves 56, 58, 60 associated with the chamber outlet. Valves 58 selectively vent the chamber outlet to atmosphere. Valves 56 are connected to fan 26 for selectively admitting fresh air to the adsorption chambers, and valves 60 selectively connect the chambers to outlet fan 30 and fuel processor 32 (FIG. 1). The valves and heaters are selectively controlled by electronic controller 28 (FIG. 1) in a first mode of operation for admitting the inlet air stream containing the volatile organic compounds for adsorption by the media, and in a second mode of operation for blocking the inlet air stream, applying electrical power to the heaters, and venting the chambers through fan 30 to fuel processor 32 (FIG. 1) to desorb the volatile organic compounds previously adsorbed and generate the hydrogen to be fed to fuel cell 34.

In the particular state of operation illustrated in FIG. 2, the inlet valves 50 associated with chambers 38, 40, 42 are open, as are the valves 58 for venting these chambers to atmosphere. Heaters 22 in chambers 38, 40, 42 are turned off, and valves 52, 56, 60 associated with chambers 38, 40, 42 are closed. Thus, chambers 38, 40, 42 are operating in the first mode of operation in which volatile organic compounds are adsorbed from the incoming air stream and the air is vented to atmosphere after such adsorption. In the meantime, inlet valves 50 and vent valves 58 associated with chambers 44, 46 are closed. Heater 22 of chamber 46 is turned on, and valve 60 is closed so that the volatile organic compounds released or desorbed from material 48 in chamber 46 are fed by fan 30 to fuel processor 32 (FIG. 1). Fan 30 operates through valve 60 to create a partial vacuum chamber 46 (all other valves 50–56 are closed) to assist desorption and transport of the volatile organic compounds without requiring use of a sweep gas. Heater 22 associated with chamber 44 is turned off following the desorption operation in that chamber, valve 56 is open to admit air flow from fan 26, and valve 52 is open so that any residual volatile organic compounds within chamber 44 are returned by line 54 to the inlet side of fan 18. This cool-down operation in chamber 44 prevents any stray volatile organic compounds remaining in the chamber from escaping to atmosphere. It is necessary to cool the adsorbent material prior to returning to the first mode of operation so that the adsorbent material will properly adsorb the volatile organic compounds in the next operating cycle.

After the heater within chamber 44 is sufficiently cool, valves 58, 52 associated with chamber 44 can be closed, valves 50, 58 are opened, and chamber 44 is returned to the first mode of operation for adsorbing volatile organic compounds from the incoming air stream. Chamber 38 may be switched to the second mode of operation, for example, by closing valves 50, 58 and opening valve 60 associated with chamber 38, and by activating heater 22 in chamber 38. In the meantime, chamber 46 may be switched to the cool-down mode by closing valve 60 and opening valves 52, 56 associated with chamber 46, and terminating operation of heater 22 in chamber 46. In this way, the adsorption system chambers are continuously cycled for continuously adsorbing the volatile organic compounds from the paint spray booth exhaust, while at the same time continuously feeding hydrogen fuel to fuel cell 34.

There have thus been disclosed a system and method for removing volatile organic compounds from an air stream that fully satisfy all of the objects and aims previously set forth. Net energy input is reduced or eliminated. Although the invention has been disclosed in connection with abatement of volatile organic compounds in the exhaust from a vehicle paint spray booth, the invention is certainly not limited to this specific albeit presently preferred implementation. Indeed, it is envisioned that the invention can be employed in connection with any industrial process that releases volatile organic compounds at a temperature below about 150° F. Several modifications and variations have been suggested in conjunction with the detailed description of the presently preferred embodiment of the invention. Other modifications and variations will readily suggest themselves to persons of ordinary skill in the art. The invention is intended to embrace all such modifications and variations as fall within the spirit and broad scope of the appended claims.

The invention claimed is:

1. A method of removing volatile organic compounds from an air stream that comprises the steps of:
   - (a) directing an air stream containing volatile organic compounds through an adsorbent to remove the volatile organic compounds from the air stream by adsorption,
   - (b) following termination of said step (a), heating said adsorbent to release the volatile organic compounds adsorbed in said step (a),
   - (c) directing the volatile organic compounds released in said step (b) to a fuel processor without the use of sweep air to convert the volatile organic compounds to hydrogen and oxides of carbon, and
   - (d) directing the hydrogen from said step (c) to a fuel cell to produce electricity.

2. The method set forth in claim 1 comprising the additional steps of:
   - (e) providing a plurality of adsorbents, and (f) directing the air stream in said step (a) to at least one of said adsorbents while heating at least one other of said adsorbents per said step (b).

\* \* \* \* \*